US008060892B2

(12) United States Patent
Ott et al.

(10) Patent No.: US 8,060,892 B2
(45) Date of Patent: Nov. 15, 2011

(54) EXECUTING BUSINESS LOGIC EXTENSIONS ON A CLIENT COMPUTING SYSTEM

(75) Inventors: Michael James Ott, Redmond, WA (US); Alexander M. Tkatch, Sammamish, WA (US); Arash Ghanaie-Sicanle, Redmond, WA (US); Akezyt Janedittakarn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1046 days.

(21) Appl. No.: 11/796,504

(22) Filed: Apr. 27, 2007

(65) Prior Publication Data

US 2008/0271059 A1 Oct. 30, 2008

(51) Int. Cl.
*G06F 13/00* (2006.01)
(52) U.S. Cl. ......... 719/330; 709/201; 709/203; 709/227
(58) Field of Classification Search .................. 719/330; 709/201, 203, 227
See application file for complete search history.

(56) References Cited

U.S. PATENT DOCUMENTS

| | | | | |
|---|---|---|---|---|
| 6,131,116 | A * | 10/2000 | Riggins et al. ............... | 709/219 |
| 6,594,682 | B2 | 7/2003 | Peterson et al. | |
| 7,089,284 | B2 | 8/2006 | Pardikar et al. | |
| 7,095,250 | B1 | 8/2006 | Stolitzka et al. | |
| 7,676,538 | B2 * | 3/2010 | Potter et al. ................... | 709/200 |
| 2001/0049721 | A1 | 12/2001 | Blair et al. | |
| 2002/0065800 | A1 | 5/2002 | Morlitz | |
| 2004/0205068 | A1 * | 10/2004 | Iyer et al. ....................... | 707/10 |
| 2005/0155027 | A1 | 7/2005 | Wei | |
| 2006/0080363 | A1 | 4/2006 | Vadlamani et al. | |
| 2006/0080468 | A1 | 4/2006 | Vadlamani et al. | |
| 2006/0206583 | A1 | 9/2006 | Hill | |
| 2007/0005642 | A1 | 1/2007 | Ghanaie-Sichanie et al. | |
| 2007/0006237 | A1 | 1/2007 | Ghanaie-Sichanie et al. | |
| 2007/0078950 | A1 * | 4/2007 | Hopkins et al. ............... | 709/217 |
| 2007/0083486 | A1 * | 4/2007 | Bloch et al. ....................... | 707/1 |
| 2008/0222628 | A1 * | 9/2008 | Batra et al. ..................... | 717/171 |

FOREIGN PATENT DOCUMENTS

EP 1632894 A1 3/2006

OTHER PUBLICATIONS

"Smart Client Architectures for the Mobile Developer", Mar. 11, 2006.
Zhang, et al., "The Multi-Tier Architecture Based on Offline Component Agent".
"Smart Client Architectures for the Mobile Developer" Mar. 11, 2006, Whitepaper, IAnywhere Solutions, Inc., 15 pages.
Zhang et al., "The Multi-Tier Architecture Based on Offline Component Agent," Dec. 2002, 7th International Conference on Computer Supported Cooperative Work in Design. 4 pages.

* cited by examiner

*Primary Examiner* — Andy Ho
(74) *Attorney, Agent, or Firm* — Hope Baldauff Hartman, LLC

(57) ABSTRACT

Technologies are described herein for executing business logic extensions on a client computing system. A server platform exposes server-hosted application services to client applications. Calls to the server-hosted application services may be executed along with custom business logic extensions. A client platform is also provided that exposes client-hosted application services to a client application. The same business logic extensions that execute on the server platform can be utilized by the client platform. When a client application is online and connected to the server platform, the client application utilizes the server-hosted application services in the manner described above. When the client application is offline, the client application utilizes the client-hosted application services. The server platform synchronizes the business logic extensions to the client platform.

20 Claims, 6 Drawing Sheets

EXECUTING BUSINESS LOGIC EXTENSIONS ON A CLIENT COMPUTING SYSTEM

BACKGROUND

In many client-server business applications, a smart client application is utilized that is capable of functioning both when it is connected to a server computer (referred to herein as being "online") and when it is disconnected from the server computer (referred to herein as being "offline"). Often, however, the functionality provided by the client application when offline is very limited as compared to the functionality provided by the application when online. This is generally due to the fact that the complete functionality provided by the server computer and a complete data set are not available to the client application when offline.

The functionality provided by a server application in a client-server environment may be extended through the use of business logic extensions. Business logic extensions allow the developer of the server application and independent software vendors ("ISVs") to add additional functionality to a business application. Because business logic extensions are implemented on the server computer, the functionality provided by such server-side extensions is not available to a client application operating offline.

Some efforts have been made to allow the use of custom business logic extensions by an offline client application through the execution of scripts by the client application. Scripts, however, severely limit the functionality available when the client application is offline due to their limited capabilities and the difficulty in properly integrating their execution with the operation of the client application. In this regard, it can also be difficult to deploy these types of business logic extensions to multiple client applications. In many cases, ISVs are responsible for deploying the extensions and for managing the versioning and maintenance of the extensions. This process can be complicated, expensive, and time-consuming.

It is with respect to these considerations and others that the disclosure made herein is provided.

SUMMARY

Technologies are described herein for executing business logic extensions in conjunction with a client application executing on a client computing system. Through the utilization of aspects presented herein, rich custom business logic can be developed and deeply integrated with both the client and the server of such applications. Moreover, such logic can be developed and executed with rich compiled code, easily deployed to client applications, and seamlessly executed by an application platform regardless of whether the client application is online or offline.

According to one aspect presented herein, a server platform is provided that exposes server-hosted application services to client applications. The server-hosted application services are called by the client applications to access functionality provided by a client-server business application. The server-hosted application services may be exposed by the server platform as a message-based application programming interface ("API").

According to implementations, the server platform can utilize business logic extensions within its execution pipeline. For instance, when a call is made to a server-hosted application service, one or more business logic extensions can be executed in conjunction with core business operations performed by the platform. The business logic extensions are executed on a server computer and may take the form of plug-ins to an execution pipeline utilized by the server platform. The plug-ins can be executed synchronously with the execution of the pipeline or executed asynchronously at a later time. The plug-ins are created and executed using compiled program code and can therefore take advantage of operating system and application libraries.

According to other aspects presented herein, a client platform is provided in which the same business logic extensions that execute on the server platform can be utilized. The client platform exposes client-hosted application services to a client application. When the client application is online and connected to the server platform, the client application utilizes the server-hosted application services in the manner described above. However, when the client application is offline, the client application utilizes the client-hosted application services. In one implementation, the client-hosted application services are exposed to the client application through a message-based API that is identical to the API exposed by the server platform. In this manner, the client application can utilize the same API regardless of whether it is operating in online or offline mode.

In one implementation, the server platform is operative to synchronize a data set and the business logic extensions to the client platform. In this way, the same data set and business logic extensions are made available to the client application for use when executing offline. The client platform also includes an execution pipeline for executing the business logic extensions. The business logic extensions may also be executed synchronously or asynchronously by the client platform.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for executing custom business logic extensions at a client computing system. Through the use of the embodiments presented herein, a server platform exposes server-hosted application services to client applications. The server-hosted application services allow custom business logic extensions to be executed. A client platform is also provided that exposes client-hosted application services to a client application. The custom business logic extensions utilized by the server platform are synchronized to the client platform and can be utilized therein. When the client application is unable to establish a connection to the server platform, the client application will utilize the application services provided by the client platform, including execution of any business logic extensions. In this manner, a client application can provide a consistent level of functionality regardless of whether it is operating online or offline.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
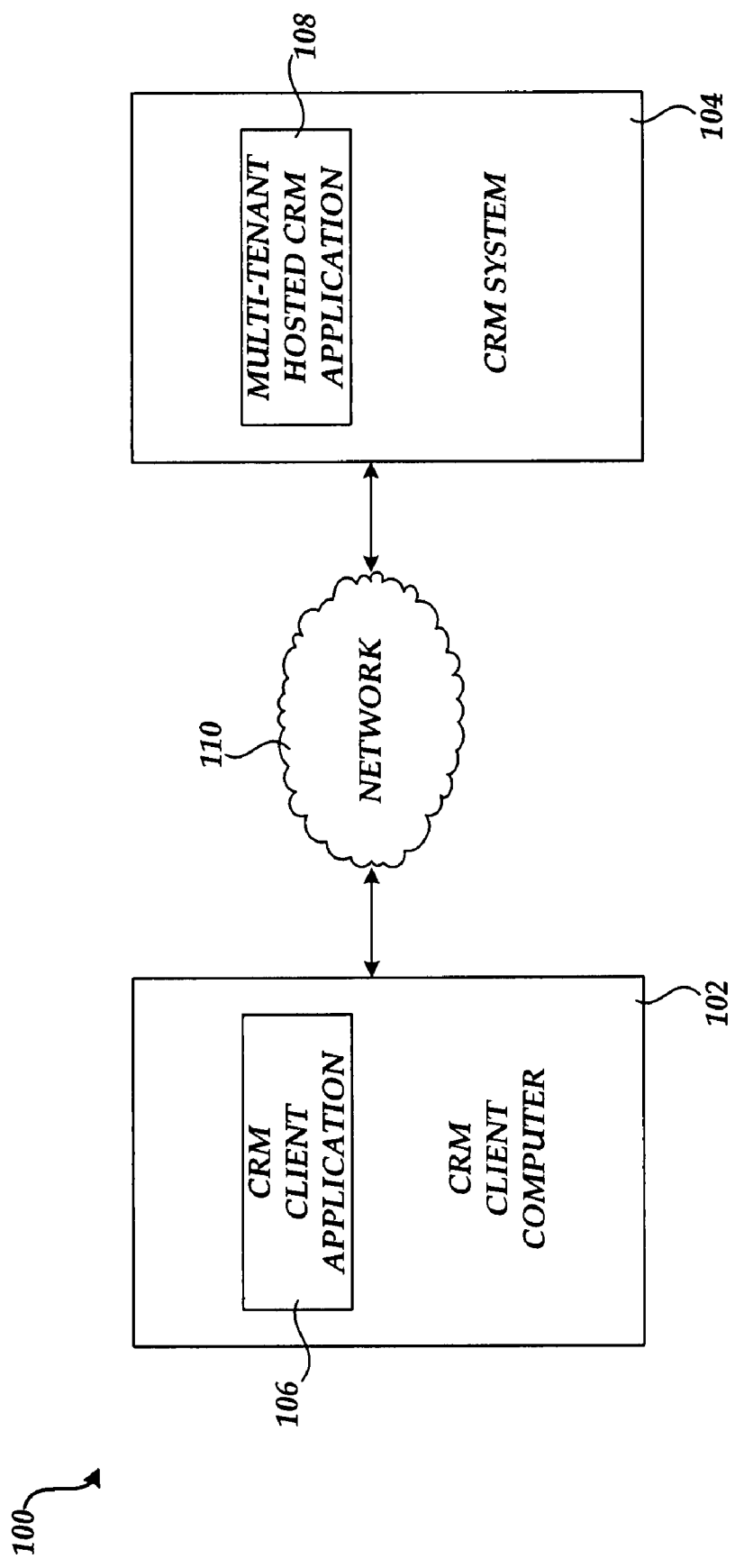
FIG. 1 is network architecture diagram showing an illustrative network architecture utilized to implement the embodiments presented herein.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for executing business logic extensions at a client computing system will be described. In particular, FIG. 1 is a network and software architecture diagram that provides details regarding an illustrative operating environment for the embodiments presented herein along with aspects of several software components presented herein. The illustrative computing system 100 shown in FIG. 1 provides a client-server business application. In the embodiments presented herein, the client-server business application provides customer relationship management ("CRM") functionality. It should be appreciated, however, that any type of client-server application may be implemented utilizing the technologies presented herein, including other types of hosted client-server applications.

The illustrative computing system 100 shown in FIG. 1 includes a CRM system 104. As will be described below with reference to FIG. 2, the CRM system 104 includes several groups of server computers that are together operative to provide a multi-tenant hosted CRM application 108 (the "CRM application"). The CRM application 108 provides functionality for managing relationships with business customers, including the capture, storage, and analysis of customer information. The CRM application 108 supports concurrent use by multiple organizations, referred to herein as "tenants." Additional details regarding the hardware and software components making up the CRM system 104 are provided below with respect to FIG. 2.

The CRM functionality provided by the CRM application 108 may be accessed and supplemented through the use of a CRM client application 106 executing on a client computing system, such as the CRM client computer 102. In one implementation, the CRM application 108 exposes a web-compatible network interface for use by the CRM client application 106. In this manner, the CRM client computer 102 can be utilized to access the functionality provided by the CRM application 108 for creating and viewing customer information, for communicating with customers via the CRM application 108, and for performing other CRM-related functions.

In one implementation, the CRM client application 106 comprises a standard personal information manager ("PIM") application equipped with a plug-in software module capable of accessing the CRM application 108 and accessing the functionality provided thereby. It should be appreciated, however, that any type of client application may utilize the various aspects presented herein. In this regard, it should be appreciated that any type of client-server application may utilize the functionality described herein and that the appended claims should not be limited to the environment and implementation shown in FIG. 1.

According to various aspects presented herein, the CRM client application 106 may operate online or offline from the CRM application 108. The CRM client application 106 is online when it is able to establish a network connection to the CRM application 108, such as through the network 110. The network 110 may be any type of suitable data communications network, including but not limited to wide area networks, local area networks, the Internet, wireless data communications networks, and others. The CRM client application 106 is offline when it is unable to establish a network connection to the CRM application 108. As will be described in greater detail below, the CRM client application 106 includes functionality for determining whether it is online or offline. Depending upon the online or offline state of the CRM client application 106, either application services exposed by the CRM system 104 or application services exposed by other software components executing on the CRM client computer 102 will be utilized. Additional details regarding this process will be provided below with respect to FIGS. 2-4.

Figure 2:
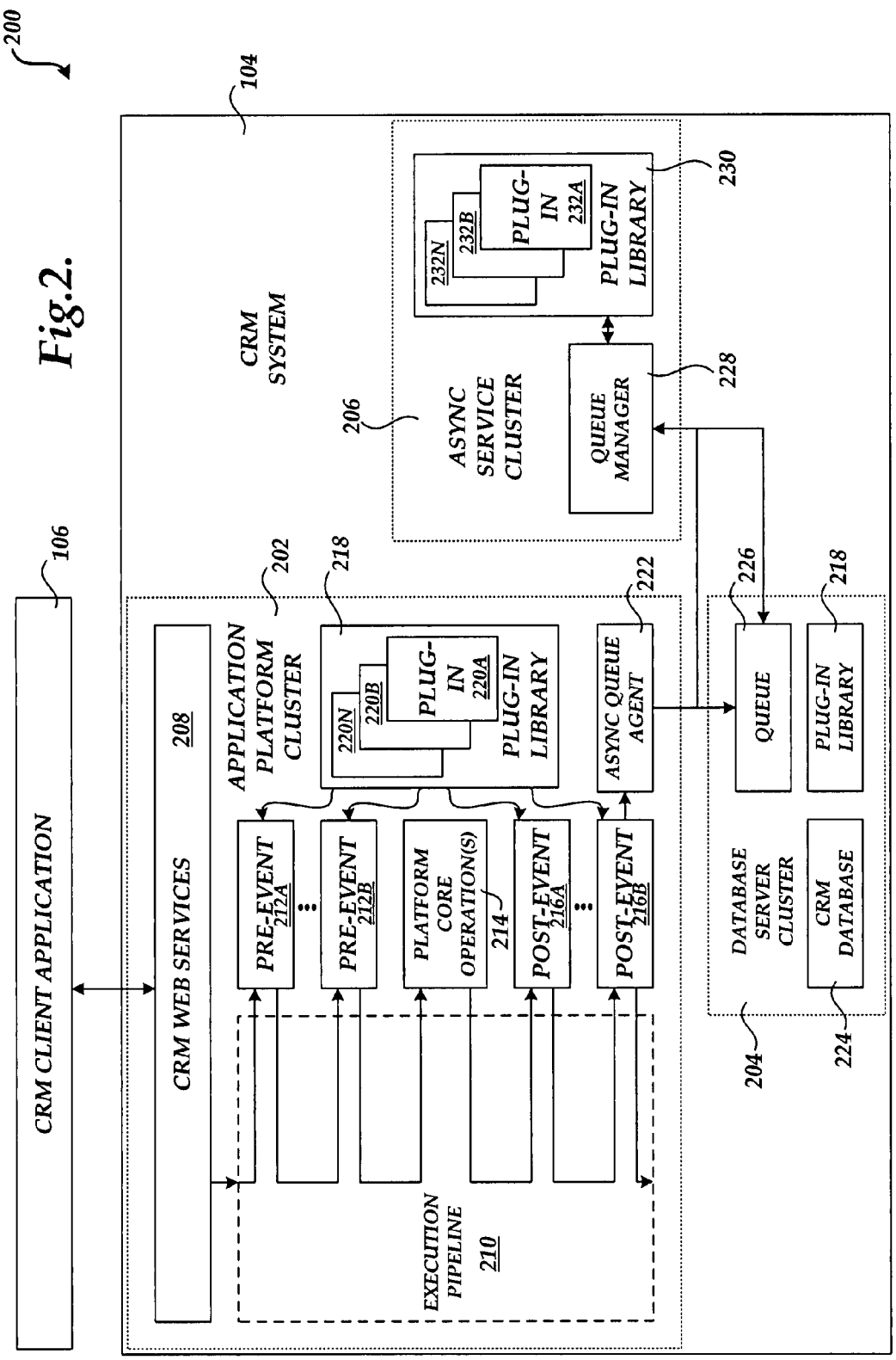
FIGS. 2 and 3 are software architecture diagrams showing aspects of a server platform and a client platform provided herein, respectively.

Referring now to FIG. 2, additional details will be provided regarding a server platform 200 utilized by the CRM system 104 to provide the CRM application 108 and to enable the execution of business logic extensions on a client computing system. The implementation of the CRM system 104 shown in FIG. 2 includes an application platform cluster 202, a database server cluster 204, and an asynchronous service cluster 206. Each of these components is described in detail below.

The application platform cluster 202 includes one or more computing systems that provide message-oriented web services, an execution pipeline, and an eventing framework. In particular, the application platform cluster 202 exposes application services to the CRM client application 106 in the form of the CRM web services 208. The CRM web services 208 accept request messages from the CRM client application 106. In response to receiving the request messages, business logic is executed inside the server platform 200, and the results of the execution are returned to the calling application. The CRM web services 208 may be exposed to the CRM client application 106 as a message-based API. Additional details regarding the use of a message-based API to extend the functionality of a CRM system can be found in U.S. patent application Ser. No. 11/290,078 (Pub. No.: US2007/0006237), filed on Nov. 30, 2005, and entitled "Using Messages to Extend CRM Functionality," which is expressly incorporated by reference herein in its entirety.

The execution pipeline 210 is executed within the application platform cluster 202 and is responsible for executing standard and custom business logic. Standard business logic and business logic extensions may be registered with the application platform cluster 202 and configured to execute within the execution pipeline 210 in a variety of ways. For instance, as shown in FIG. 2, the execution pipeline 210 may include one or more pre-events 212A-212B that are executed prior to a core business operation 214 performed by the server platform 200. The execution pipeline 210 may further include one or more post-events 216A-216B that are executed after the core business operation 214. According to one implementation, the execution pipeline 210 is multi-tenant aware and can execute business logic extensions for each tenant separately and in isolation from business logic extensions being executed on behalf of other tenants.

According to other aspects presented herein, business logic extensions may be configured and executed by the execution pipeline 210. In particular, according to one implementation presented herein, each business logic extension is implemented as a plug-in that extends or enriches the basic functionality provided by the CRM application 108. In this implementation, the application platform cluster 202 maintains a plug-in library 218 that includes one or more plug-ins 220A-220N. The plug-ins 220A-220N comprise compiled software components that can be executed within the execution pipeline 210 in response to request messages received by the CRM web services 208. The plug-ins 220A-220N may be configured for execution as pre-events 212A-212B or as post-events 216A-216B. Execution of the plug-ins 220A-220N within the execution of the pipeline 210 in this manner is referred to as synchronous execution. As will be discussed in greater detail below, the plug-ins 220A-220N may also be executed asynchronously, outside of the execution of the execution pipeline 210.

In order to execute the plug-ins 220A-220N asynchronously, an asynchronous queue agent 222 executes on the application platform cluster 202. When a plug-in 220 requires asynchronous execution, the asynchronous queue agent 222 creates an entry in the queue 226 indicating that the plug-in 232 should be executed asynchronously. The queue manager 228, executing on the asynchronous service cluster 206, periodically dequeues entries from the queue 226 and executes an associated plug-in 232. As shown in FIG. 2, the asynchronous service cluster 206 may maintain a plug-in library 230 containing asynchronous plug-ins 232A-232N. Registration and configuration information for the plug-ins 232A-232N may be stored at the asynchronous service cluster 206 or at the database server cluster 204. Through the mechanism presented herein for the asynchronous execution of business logic extensions, business logic that requires significant processing capabilities can be executed at a later time and out of process from the execution pipeline 210.

As discussed briefly above, the database server cluster 204 stores the queue 226. The database server cluster 204 may also be utilized to store the plug-in library 218. The plug-in library 218 includes the plug-ins 220A-220N, along with metadata including configuration information indicating when and how the plug-ins 220A-220N should be executed. According to implementations, the database server cluster 204 is also utilized to store a CRM database 224. The CRM database 224 includes data and metadata for each tenant of the CRM application 108. As will be described in greater detail below, the contents of the plug-in library 218 and the CRM database 224 may be deployed to the CRM client application 106 and periodically synchronized. In this manner, the data and business logic extensions utilized by the server platform 200 are made available for use at the CRM client computer 102 when offline. Additional details regarding processes for extending the functionality provided by a server platform through the use of business logic extensions can be found in U.S. patent application Ser. No. 11/290,157 (Pub. No.: US2007/0005642), filed on Nov. 30, 2005, and entitled "Modification of Logic in an Application," which is expressly incorporated herein by reference in its entirety.

Figure 3:
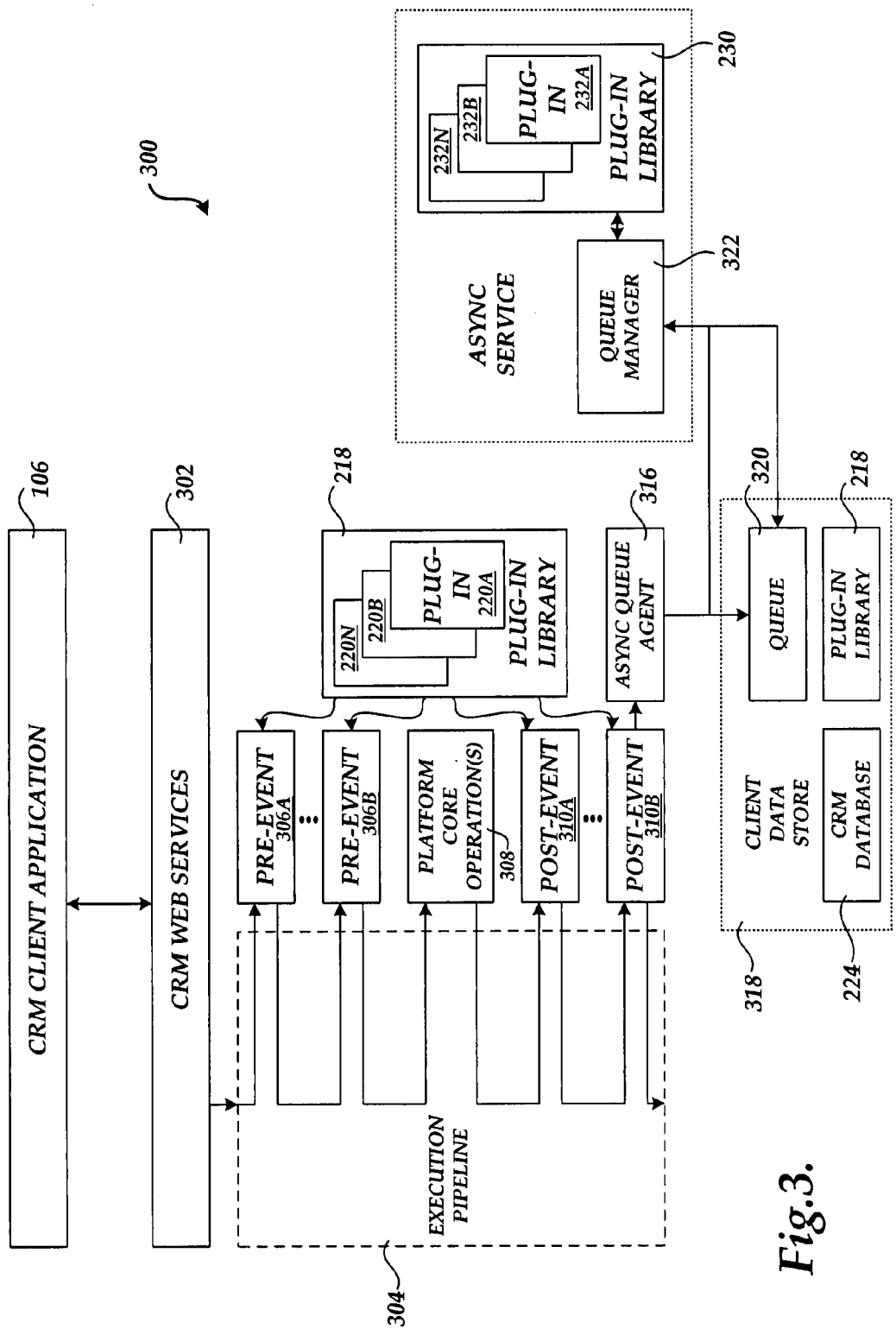

Turning now to FIG. 3, additional details will be provided regarding a client platform 300 provided herein that enables the execution of business logic extensions on a client computing platform. As shown in FIG. 3, the client platform 300 utilizes an architecture similar to that of the server platform 200 described above with respect to FIG. 2. The software components utilized in the client platform 300, however, are designed to run on a single client computing system, such as the CRM client computer 102, rather than in server clusters. The components shown in FIG. 3 are designed to be executed performantly on computer systems having specifications lower than that of a server computer, while at the same time providing much of the functionality described above with respect to FIG. 2.

As shown in FIG. 3, the client platform 300 exposes application services to the CRM client application 106 in the form of the CRM web services 302. The CRM web services 302 accept request messages from the CRM client application 106. In response to receiving the request messages, business logic is executed inside the client platform 300, and the results of the execution are returned to the calling application. According to one embodiment, the CRM web services 302 provides a message-based API identical to that of the CRM web services 208 provided by the server platform 200. As will be described in greater detail below, the CRM client application 106 is operative to determine whether it is online or offline. If the CRM client application 106 is online, it will utilize the server-hosted application services provided by the CRM web services 208. If the CRM client application 106 is offline, it will utilize the client-hosted application services provided by the CRM web services 302. Additional details regarding this process are provided below with respect to FIGS. 4 and 5.

The execution pipeline 304 is executed by the client platform 300 and is responsible for executing standard and custom business logic. Standard business logic and business logic extensions may be registered with the client platform 300 and configured to execute within the execution pipeline 304 in a manner similar to that described above with respect to the server platform 200. For instance, as shown in FIG. 3, the execution pipeline 304 may include one or more pre-events 306A-306B and one or more post-events 310A-310B.

According to other aspects presented herein, business logic extensions may be configured and executed by the execution pipeline 304. In particular, according to one implementation presented herein, each business logic extension is implemented as a plug-in that extends or enriches the basic functionality provided by the CRM application 108. In this implementation, the client platform 300 maintains a plug-in library 218 that includes the plug-ins 220A-220N. As mentioned above, the plug-ins 220A-220N are deployed from the server platform 200 to the client platform 300 for execution within the execution pipeline 304. The plug-ins 220A-220N may be configured for execution as pre-events 306A-306N or as post-events 310A-310N. Execution of the plug-ins 220A-220N within the execution of the pipeline 304 in this manner is referred to as synchronous execution. As with the server platform 200 described above, the plug-ins 220A-220N may also be executed asynchronously by the client platform 300, outside of the execution of the execution pipeline 304.

In order to execute the plug-ins 220A-220N asynchronously, an asynchronous queue agent 316 executes on the client platform 300. When a plug-in 220 requires asynchronous execution, the asynchronous queue agent 316 creates an entry in the queue 320 indicating that the plug-in should be executed asynchronously. The queue manager 322, executing on the client platform 300, periodically dequeues entries from the queue 320 and executes an associated plug-in. The client platform 300 may maintain a plug-in library 230 containing asynchronous plug-ins 232A-232N. Registration and configuration information for the plug-ins 232A-232N may be stored in the client data store 318. Through the mechanism presented herein for the asynchronous execution of business logic extensions, business logic that requires significant processing capabilities can be executed by the client platform 300 at a later time and out of process from the execution pipeline 304.

The client data store 318 may also be utilized to store the plug-in library 218. The plug-in library 218 includes the plug-ins 220A-220N, along with metadata including configuration information indicating when and how the plug-ins 220A-220N should be executed. The client data store 318 may also be utilized to store all or a portion of the CRM database 224. According to embodiments, the server platform 200 synchronizes appropriate portions of the CRM database 224 to the client data store 318 for use when the CRM client application 106 is offline. The contents of the client data store 318 may be synchronized based upon what a user of the CRM client application 106 requests, automatically, and when the CRM client computer 102 is going offline. Additional details regarding this process will be provided below.

Figure 4:
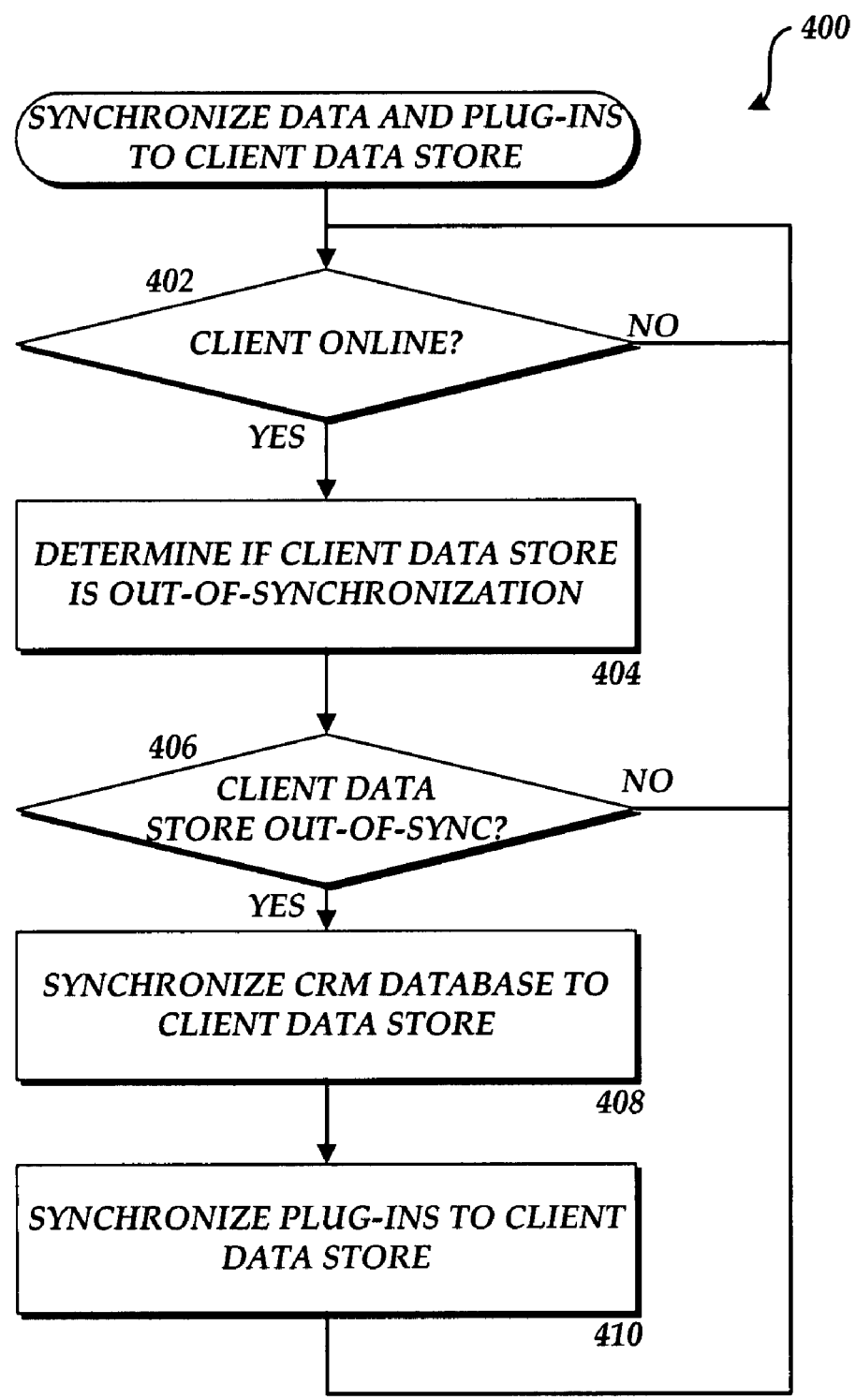
FIG. 4 is a flow diagram showing an illustrative process for synchronizing data and business logic extensions from a server platform to a client platform in one implementation.

Turning now to FIG. 4, additional details will be provided regarding the embodiments presented herein for executing business logic extensions on a client computing system. In particular, FIG. 4 is a flow diagram showing a routine 400 that shows aspects of an illustrative process for deploying and synchronizing the contents of the CRM database 224 and the plug-in library 218 from the server platform 200 to the client platform 300 in one implementation described herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the CRM client application 106 determines if it is online with the server platform 200. If the CRM client application is offline, it is not possible for synchronization to take place. Accordingly, if the CRM client application 106 is offline, the routine 400 returns to operation 402. If the CRM client application 106 is online, a determination is made through communication with the server platform 200 as to whether the contents of the client data store 318 is out-of-synchronization from the server platform 200. In particular, a determination is made as to whether the CRM database 224 and the plug-in library 218 stored in the client data store 318 need to be updated. If the client data store 318 does not need to be updated, the routine 400 returns to operation 402, described above.

If, at operation 406, it is determined that the client data store 318 needs to be updated, the routine 400 continues from operation 406 to operation 408. At operation 408, portions of the CRM database 224 at the server platform 200 are utilized to update the contents of the CRM database stored in the client data store 318. Once the CRM database 224 has been synchronized, the routine 400 continues to operation 410, where the contents of the plug-in library 218 are synchronized. Once the plug-in library 218 has been synchronized, the routine 400 returns to operation 402, described above. It should be appreciated that the synchronization process shown in FIG. 4 may be performed periodically in an automated fashion, or manually in response to a user command. Alternately, the process shown in FIG. 4 may be performed when the CRM client computer 102 is going offline.

Figure 5:
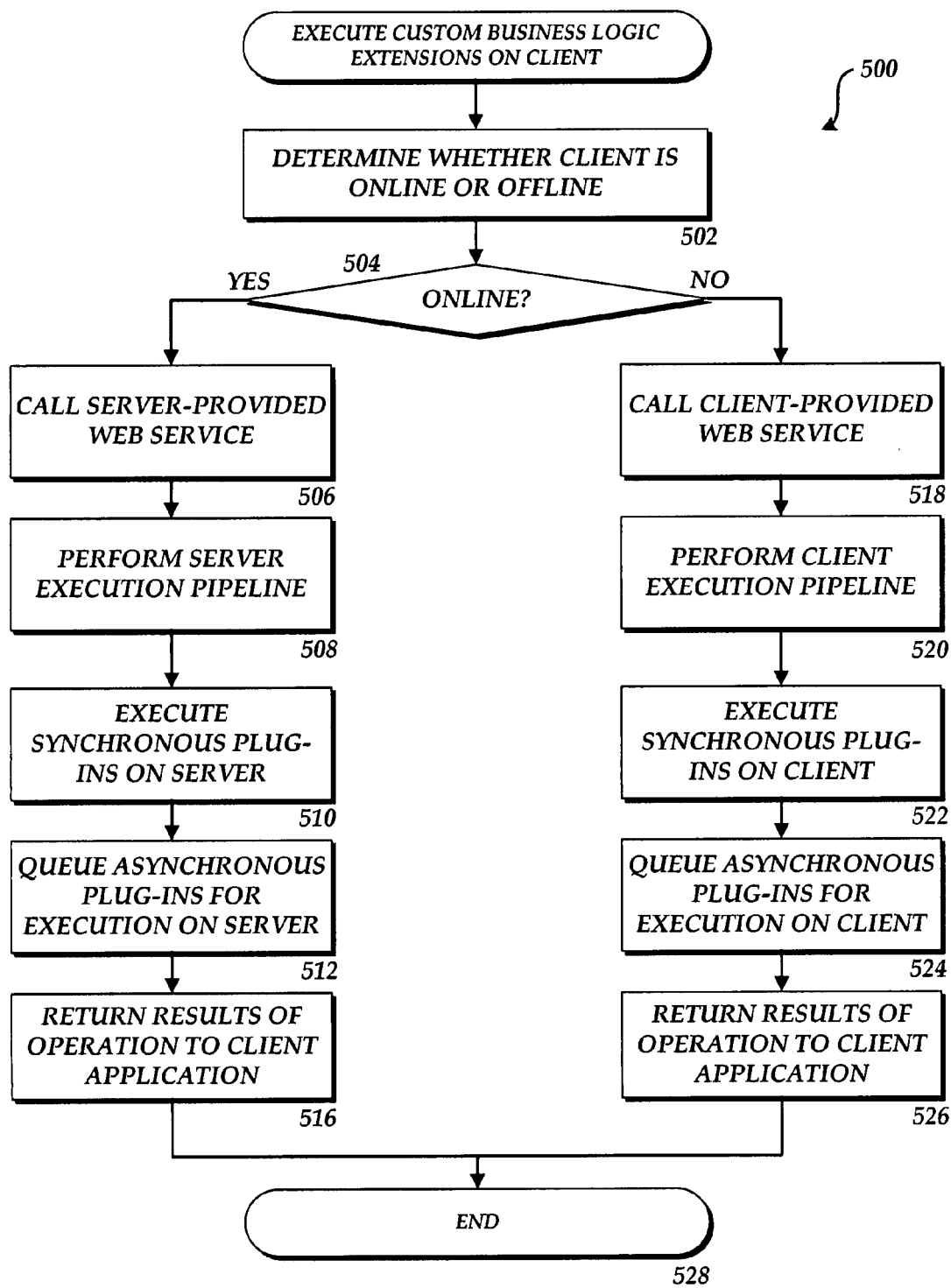
FIG. 5 is a flow diagram showing an illustrative process for executing custom business logic on a client computing system in one implementation described herein.

Referring now to FIG. 5, an illustrative routine 500 will be described for executing business logic extensions on a client computing system. The routine 500 begins at operation 502, where the CRM client application 106 determines whether it is online or offline. If the CRM client application 106 is online, the routine 500 branches from operation 504 to operation 506, where the CRM client application 106 utilizes the server-provided application services described above with respect to FIG. 2.

At operation 506, the CRM client application 106 calls the CRM web services 208 with a request. In response thereto, the routine 500 continues to operation 508, where the execution pipeline 210 is performed for the request. As a part of the execution of the pipeline 210, any specified plug-ins 220A-220N are executed on the server platform 200 at operation 510. Additionally, if any plug-ins have been configured for asynchronous execution, these plug-ins are queued in the manner described above with reference to FIG. 2 at operation 512. As discussed above, these plug-ins may be executed asynchronously at a later time. From operation 512, the routine 500 continues to operation 516, where the server platform 200 returns the results of the operation to the calling CRM application 106. The routine 500 then continues from operation 516, to operation 528, where it ends.

If, at operation 504, the CRM client application 106 determines that it is offline, the routine 500 branches from operation 504 to operation 518, where the CRM client application 106 utilizes the client-provided application services described above with respect to FIG. 3. In particular, at operation 518, the CRM client application 106 calls the CRM web services 302 with a request. In response thereto, the routine 500 continues to operation 520, where the execution pipeline 304 is performed for the request. As a part of the execution of the pipeline 304, any specified plug-ins 220A-220N are executed on the client platform 300 at operation 522. Additionally, if any plug-ins have been configured for asynchronous execution, these plug-ins are queued for execution in the manner described above with reference to FIG. 3 at operation 524. As discussed above, these plug-ins may be executed asynchronously at a later time by the client platform 300. From operation 524, the routine 500 continues to operation 526, where the client platform 300 returns the results of the operation to the calling CRM application 106. The routine 500 then continues from operation 526, to operation 528, where it ends.

Figure 6:
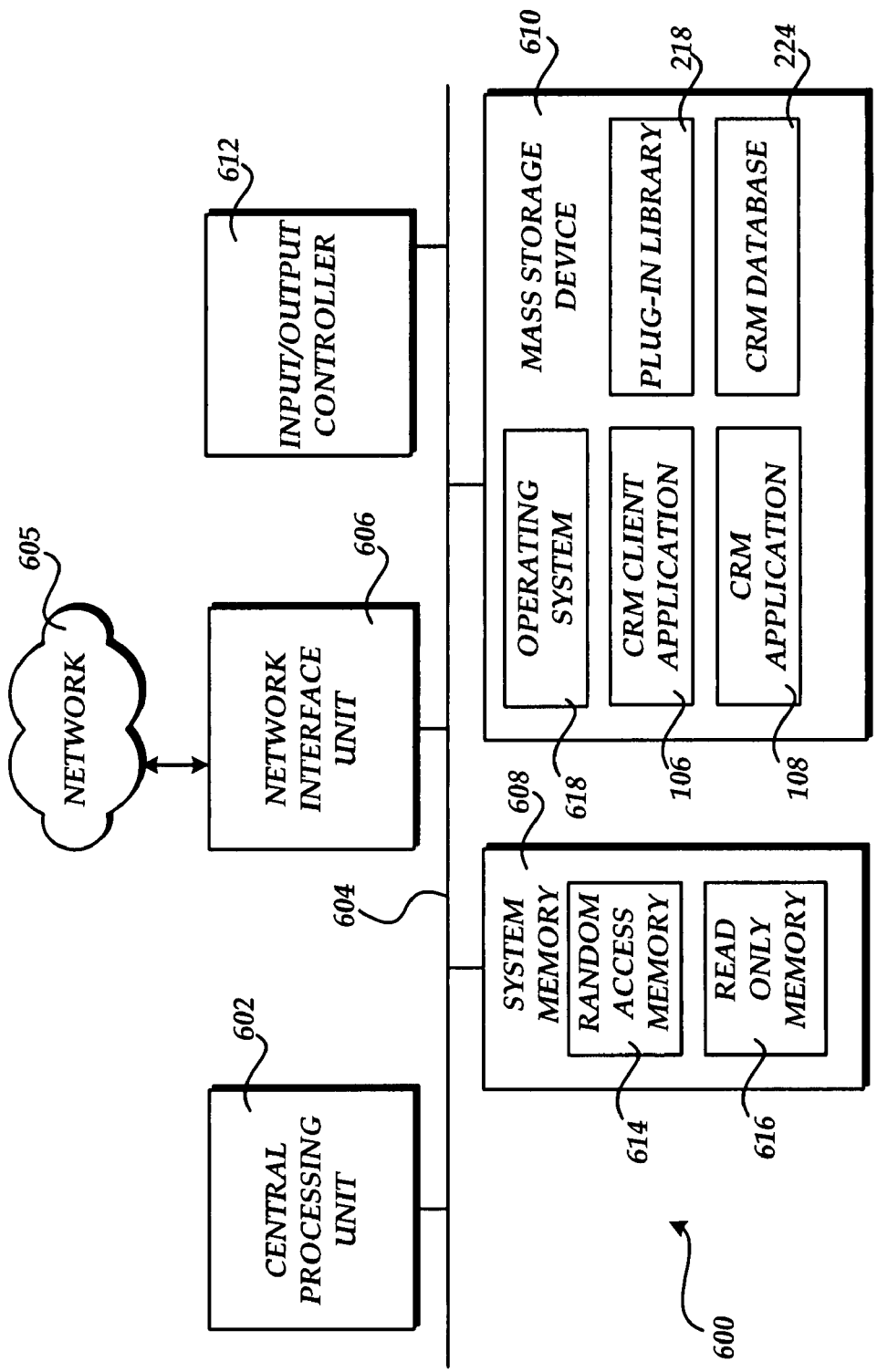
FIG. 6 is a computer architecture diagram showing an illustrative hardware architecture suitable for implementing the computing systems and processes described with reference to FIGS. 1-5.

Referring now to FIG. 6, an illustrative computer architecture for a computer 600 capable of executing the software components described above with respect to FIGS. 1-5 will be discussed. The computer architecture shown in FIG. 6 illustrates a conventional desktop, laptop computer, or server computer and may be utilized to embody any of the computer systems described herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which will be described in greater detail below.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 605. The computer 600 may connect to the network 605 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system suitable for controlling the operation of a networked desktop, laptop, or server computer. The mass storage device 610 and RAM 614 may also store one or more program modules. In particular, the mass storage device 610 and the RAM 614 may store the CRM client application 106, the CRM application 108, the plug-in library 218, and the CRM database 224, each of which has been described above with reference to FIGS. 1-5. Other program modules described herein may also be stored in the mass storage device 610 and utilized by the computer 600.

Based on the foregoing, it should be appreciated that technologies for executing business logic extensions on a client computing system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system for executing business logic extensions in a client application, the system comprising:
a server platform operative to execute a business logic execution pipeline, to expose one or more server-hosted application services to the client application, to receive a request from the client application to perform one of the server-hosted application services and, in response to the request, to execute the business logic execution pipeline and one or more plug-ins to the business logic execution pipeline on a server computer; and
a client platform operative to expose one or more client-hosted application services to the client application, to receive a request from the client application to execute one of the client-hosted application services and, in response to the request, to execute one or more of the plug-ins to the business logic execution pipeline on a client computer.

2. The system of claim 1, further comprising a client application operative to determine whether a connection can be established to the server platform, to utilize the server-hosted application services when a connection can be established to the server platform, and to utilize the client-hosted application services when a connection cannot be established to the server platform.

3. The system of claim 2, wherein the client platform and the server platform are further operative to synchronize the one or more plug-ins to the business logic execution pipeline between the client computer and the server computer.

4. The system of claim 2, wherein executing the one or more business logic extensions comprises executing one or more of the plug-ins to the business logic execution pipeline synchronously with the business logic execution pipeline.

5. The system of claim 4, wherein the plug-ins to the business logic execution pipeline execute prior to execution of a core business operation performed by the business logic execution pipeline when the plug-ins to the business logic execution pipeline are executed synchronously with the execution of the business logic execution pipeline.

6. The system of claim 4, wherein the plug-ins to the business logic execution pipeline execute after execution of a core business operation performed by the business logic execution pipeline when the plug-ins to the business logic execution pipeline are executed synchronously with the execution of the business logic execution pipeline.

7. The system of claim 2, wherein executing the one or more business logic extensions comprises executing one or more of the plug-ins to the business logic execution pipeline asynchronously from the execution of the business logic execution pipeline.

8. The system of claim 2, wherein the one or more plug-ins to the business logic execution pipeline comprise compiled program code.

9. The system of claim 2, wherein the server-hosted application services and the client-hosted application services expose an identical application programming interface (API) to the client application.

10. The system of claim 9, wherein the API comprises a message-based API.

11. A computer-readable storage medium having computer executable instructions stored thereupon which, when executed by a computer, cause the computer to:
   provide a client platform, the client platform operative to expose one or more client-provided application services for executing plug-ins to a business logic execution pipeline to a client application executing on the computer; and to
   execute a client application on the computer, the client application operative to determine whether a connection can be established to a server platform exposing one or more server-provided application services to the client application, to utilize the server-provided application services to execute the plug-ins to the business logic execution pipeline on the server platform if a connection can be established to the server platform, and to utilize the client-provided application services to execute the plug-ins to the business logic execution pipeline on the client platform if a connection cannot be established to the server platform.

12. The computer-readable storage medium of claim 11, wherein the client platform is further operative to synchronize the one or more plug-ins to the business logic execution pipeline with plug-ins to the business logic execution pipeline stored at the server computer.

13. The computer-readable storage medium of claim 12, wherein the client-provided application services are exposed through a message-based application programming interface (API) that is identical to an API exposed by the server-provided application services.

14. The computer-readable storage medium of claim 13, wherein the plug-ins to the business logic execution pipeline are executed synchronously with execution of business logic execution pipeline or asynchronously from the execution of the business logic execution pipeline.

15. The computer-readable storage medium of claim 14, wherein the plug-ins to the business logic execution pipeline execute prior to execution of a core business operation performed by the business logic execution pipeline when the plug-ins to the business logic execution pipeline are executed synchronously with the execution of the business logic execution pipeline.

16. The computer-readable storage medium of claim 14, wherein the plug-ins to the business logic execution pipeline execute after execution of a core business operation performed by the business logic execution pipeline when the plug-ins to the business logic execution pipeline are executed synchronously with the execution of the business logic execution pipeline.

17. A method for executing plug-ins to a business logic extensions execution pipeline in a client application, the method comprising:
   providing a server platform, the server platform operative to execute a business logic execution pipeline and to expose a message-based application programming interface (API) for accessing functionality provided by the business logic execution pipeline to a plurality of client computers;
   maintaining one or more plug-ins to the business logic execution pipeline in the server platform, the same business logic extensions executable on a server computer and on the client computers;
   executing 'one or more of the plug-ins to the business logic execution pipeline on the server computer in response to calls to the API from client applications executing on the client computers; and
   periodically synchronizing the plug-ins to the business logic execution pipeline to the client computers for execution on the client computers in response to calls received from the client applications.

18. The method of claim 17, wherein the plug-ins comprise compiled program code.

19. The method of claim 18, wherein the plug-ins may be executed synchronously or asynchronously.

20. The method of claim 19, wherein the plug-ins to the business logic execution pipeline execute prior to or after execution of a core business operation performed by the business logic execution pipeline when the plug-ins to the business logic execution pipeline are executed synchronously with the execution of the business logic execution pipeline.

* * * * *

UNITED STATES PATENT AND TRADEMARK OFFICE
CERTIFICATE OF CORRECTION

PATENT NO.       : 8,060,892 B2
APPLICATION NO.  : 11/796504
DATED            : November 15, 2011
INVENTOR(S)      : Michael James Ott et al.

It is certified that error appears in the above-identified patent and that said Letters Patent is hereby corrected as shown below:

In Face page, in field (75), under "Inventors" column 1, line 4, delete "Ghanaie-Sicanle," and insert -- Ghanaie-Sichanie, --, therefor.

In column 12, line 15, in Claim 17, delete "extensions execution" and insert -- execution --, therefor.

In column 12, line 27, in Claim 17, delete "executing'" and insert -- executing --, therefor.

Signed and Sealed this
Seventh Day of February, 2012

David J. Kappos
*Director of the United States Patent and Trademark Office*